United States Patent [19]

Reinhart

[11] Patent Number: 5,000,611

[45] Date of Patent: Mar. 19, 1991

[54] ATTACHMENT STRUCTURE FOR CYLINDRICAL MEMBER

[75] Inventor: Theodore J. Reinhart, Dayton, Ohio

[73] Assignee: The United States of America as represented by the Secretary of the Air Force, Washington, D.C.

[21] Appl. No.: 215,663

[22] Filed: Jul. 6, 1988

[51] Int. Cl.⁵ ............................................... B25G 3/34
[52] U.S. Cl. ..................................... 403/265; 156/294;
156/305; 156/303.1; 24/114.5; 24/265 EE
[58] Field of Search ................................ 403/265–268;
24/114.5, 265 EE; 156/294, 303.1, 305

[56] References Cited

U.S. PATENT DOCUMENTS

| | | | |
|---|---|---|---|
| 3,143,366 | 8/1964 | Nichols | 403/16 |
| 3,507,949 | 4/1970 | Campbell | 24/265 EE |
| 4,057,687 | 11/1977 | Willem | 174/179 |
| 4,127,741 | 11/1978 | Bauer et al. | 403/268 X |
| 4,130,926 | 12/1978 | Willem | 29/421 |
| 4,198,739 | 4/1980 | Budinger et al. | 156/294 X |
| 4,241,490 | 12/1980 | Edwards | 403/281 X |
| 4,360,288 | 11/1982 | Rutledge, Jr. et al. | 403/268 |
| 4,597,688 | 7/1986 | Pagan | 403/265 |
| 4,662,774 | 5/1987 | Morrow, Jr. | 403/266 |
| 4,719,063 | 1/1988 | White | 264/45.2 |
| 4,793,042 | 12/1988 | Easter | 156/294 X |

FOREIGN PATENT DOCUMENTS

| | | | |
|---|---|---|---|
| 60154 | 9/1982 | European Pat. Off. | 403/268 |
| 622622 | 7/1978 | U.S.S.R. | 403/265 |
| 489874 | 8/1938 | United Kingdom | 403/268 |

*Primary Examiner*—Randolph A. Reese
*Assistant Examiner*—Arlen L. Olsen
*Attorney, Agent, or Firm*—Bobby D. Scearce; Donald J. Singer

[57] ABSTRACT

A combination mechanically retained and adhesively bonded attachment structure and method for a guy wire, cable, rod, tube or like member is described which comprises an elongate fitting of preselected external shape having a plurality of axially spaced coaxial bores of respective preselected diameters, the smallest selected to loosely receive the member to be attached, the annular spaces defined between the fitting and member being packed with a finely divided particulate abrasive material and filled with a curable resin to form an adhesive bond between the abrasive material, fitting and member and to define abrasive interfaces between the abrasive material and fitting and between the abrasive material and member.

5 Claims, 1 Drawing Sheet

ATTACHMENT STRUCTURE FOR CYLINDRICAL MEMBER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to structures and methods for securing the end of a rod, guy wire, cable or like member, and more particularly to a novel high performance attachment structure for high strength guy wires, cables, tubes and rods.

Existing attachment structures for guy wires, cables and like members include either mechanical fastening or adhesive bonding without redundancy and often fail prematurely in service at relatively low loads. Mechanical fastening normally includes crushing or crimping of the secured end of the attached member and is by itself a highly inefficient and unreliable attachment method. Adhesive bonding alone is more efficient than mechanical fastening alone, but most existing adhesives can withstand only undesirably low stress levels over extended time periods under environmental exposure.

The invention described herein solves or substantially reduces in critical importance shortcomings in existing attachment structures by providing a combination of mechanically retained and adhesively bonded end attachment fo high strength cables, guy wires, composite rods or tubes, and like members. The invention includes an elongate fitting of suitable external shape having along a central axis from one end of the fitting to the other a plurality of axial bores of successively larger diameters, the smallest bore sized to loosely receive the member to be attached. Attachment to a guy wire, cable or like member is perfected by inserting the member into the fitting, packing each annular space defined around the outer surface of the member with finely divided particulate abrasive material, injecting thermosetting or thermoplastic resin into the packed material, and curing the resin to form an adhesive bond between the abrasive material, fitting and member. Loads are transferred between the fitting and attached member by a combined mechanical lock and structural adhesive bond. The attachment structure of the invention is capable of transmitting tension, compression or torsion loads or a combination of loads, and finds utility in antenna guy wires and support cables, underwater mooring cables, composite landing gear actuation rods, torque transmitting tubes and similar applications.

It is therefore a principal object of the invention to provide an attachment structure for a high strength guy wire, cable, tube, rod or like member.

It is another object of the invention to provide a combination mechanically retained and adhesively bonded attachment structure for guy wires, cables and the like having redundant load paths.

It is a further object of the invention to provide a method for making a combination mechanically retained and adhesively bonded high strength attachment to a guy wire, cable, tube, rod or like member.

These and other objects of the invention will become apparent as the detailed description of representative embodiments proceeds.

SUMMARY OF THE INVENTION

In accordance with the foregoing principles and objects of the invention, a combination mechanically retained and adhesively bonded attachment structure and method for a guy wire, cable, rod, tube or like member is described which comprises an elongate fitting of preselected external shape having a plurality of axially spaced coaxial bores of respective preselected diameters, the smallest sized to loosely receive the member to be atttached, the annular spaces defined between the fitting and member being packed with a finely divided particulate abrasive material of preselected hardness, shape and particle size and particle size distribution, and filled with curable or thermoplastic resin to form an adhesive bond between the abrasive material, fitting and member.

DESCRIPTION OF THE DRAWINGS

The invention will be clearly understood from the following detailed description of representative embodiments thereof read in conjunction with the accompanying drawings wherein.

DETAILED DESCRIPTION

Figure 1:
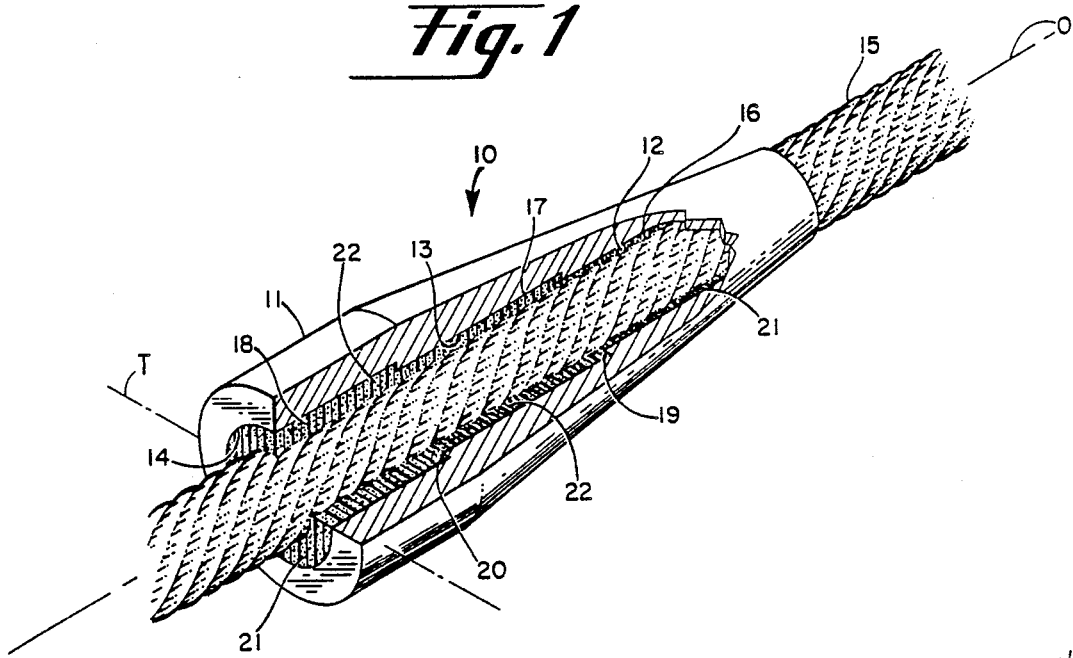
FIG. 1 is a perspective view in partial axial section of a representative end fitting configuration of the invention.
Figure 2:
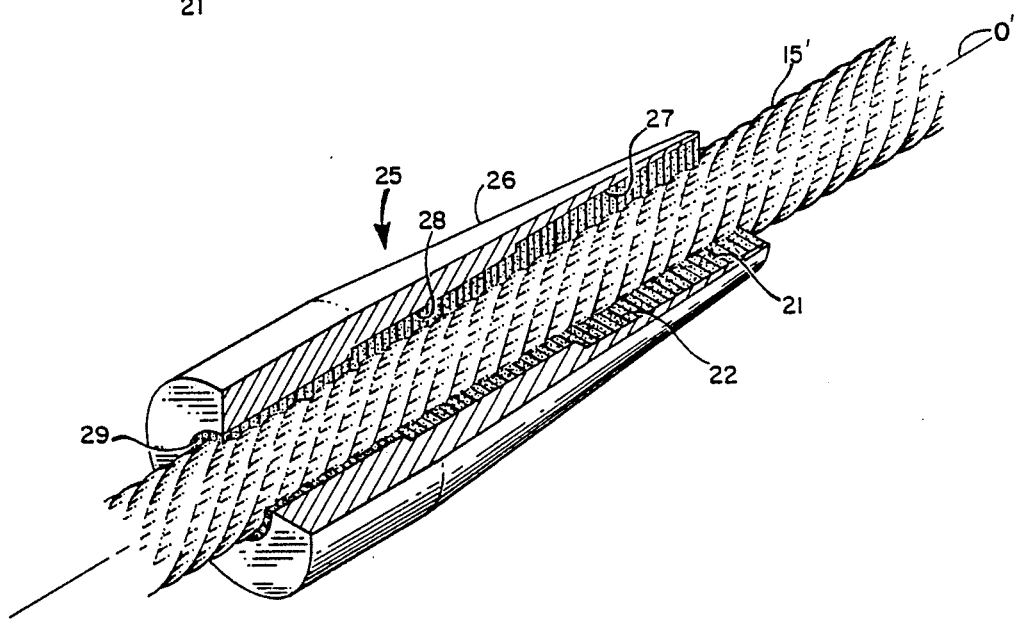
FIG. 2 is a perspective view in partial axial section of an alternative end fitting configuration of the invention.

Referring now to FIGS. 1 and 2, shown therein are perspective views in partial axial section of two representative configurations for the end fitting of the invention. Fitting 10 of the FIG. 1 configuration comprises an elongate component 11 defined along a generally central axis 0. Component 11 may have substantially any overall size and shape and may comprise metallic, composite, plastic or other material as might be selected for a particular application by the skilled artisan, the shape illustrated in FIGS. 1 and 2 as having generally circular cross section and tapered exterior contour being exemplary as presenting an overall shape and outer surface convenient for gripping by other anchor means (not shown). A flange, shoulder, lug or like means (not shown) may also be included on the outer surface of fitting 10 for attachment purposes, or a bore along a transverse axis T may be included for receiving a bolt, pin or the like. Along axis 0 through component 11 is provided a plurality of axially displaced coaxial bores 12,13,14 of sucessively larger diameter as component 11 is viewed from right to left in FIG. 1. It is noted that any suitable plurality of bores of preselected geometric shape may be included in component 11 as will become apparent from a further reading hereof, bores 12,13,14 being a representative plurality, and bores of successively larger diameter may be provided within component 11 along axis 0 from central of component 11 toward each of its ends. The smallest bore (12 in FIG. 1) is sized to loosely receive guy wire, cable, rod or like member 15 leaving annular space 16 around member 15 at bore 12. Each successively larger bore 13,14 presents successively larger annular spaces 17,18 around member 15 along axis 0, each successive annular space separated from the adjacent one by an annular shoulder 19,20 of corresponding diameter. Each annular space is tightly packed via suitable means including sonic, subsonic or ultrasonic mechanical vibration with finely divided abrasive particulate material 21 of preselected hardness, size and size distribution bound together and to the outer surface of member 15 and to the internal surfaces of component 11 by suitable thermoplastic or curable thermosetting resin 22 or other bonding agent including metals or ceramics. Abrasive material 21 preferably comprises finely divided high strength material such as silica, silicon carbide, silicon nitride, alumina, aluminum nitride, diamond or other abrasive, and resin 22 may be substantially any conventional thermosetting or thermoplastic resin (or monomer) suitable for bonding abrasive 21 and having preselected heat and environmental characteristics, such as epoxy, acrylic, phenolic, polyester, polyurethane, and polyimide, or nylon, polyether ether ketone, polyphenylene sulfide, polyester, polyimide sulfone, polyamide imide or the like, specific abrasive 21 and resin 22 selection not being considered limiting of the invention herein described.

FIG. 2 shows an alternative configuration for the invention wherein fitting 25 includes an elongate component 26 defined along axis 0' and having a plurality of coaxial bores 27, 28, 29 in a succession of diameters which is reversed compared to that of FIG. 1. Abrasive 21 and resin 22 are disposed within the annular spaces around member 15' in the same manner described above for the FIG. 1 embodiment.

Referring again to the representative embodiment of FIG. 1, fitting 10 of the invention is attacheded to member 15 by a preferred method as follows. The surfaces of member 15 and fitting 10 to be joined are first prepared for adhesive bonding utilizing conventional surface preparation techniques depending on materials comprising member 15, fitting 10 and abrasive 21 and of resin 22 selected for bonding. For example, in an end attachment made in demonstration of the invention utilizing a fitting 10 of the FIG. 1 configuration comprising a high strength aluminum alloy (7075-TG) to attach a member 15 comprising glass fibers in epoxy resin, silicon carbide was selected for abrasive 21 and a two part thermosetting epoxy was selected for resin 22. Member 15 is inserted to a predetermined axial extent into fitting 10 and annular spaces 16,17,18 are filled tightly with abrasive 21 and packed by mechanical vibration. It may be noted here that particle size and size distribution for abrasive 21 may be selected so that annular spaces 16,17,18 are substantially filled. Particle size may be preferably selected in the range of 1 to 2000 microns depending on cavity geometry. The particulate abrasive 21 may then be compacted in place using conventional techniques such as sonic, subsonic or ultrasonic vibration, or other mechanical method. Resin 22 (or the mixed reacting components thereof) is then flowed or injected into compacted abrasive 21 in order to surround and bind in place abrasive 21 and to bond abrasive 21 to fitting 10 and member 15. Resin 22 is then cured or solidified in place. The attachment so constructed is then ready for application of service loads. Numerous variations to the method are envisioned as might occur to the skilled artisan guided by these teachings, which variations are considered to be within the scope of the claims. One such method includes mechanically pretressing (in tension, compression or torsion) the packed assembly prior to injection and solidification of the resin or binder; solidification under the preapplied load may be accomplished. It is noted that the end attachment so made has redundant load bearing capability in that member 15 is held within fitting 10 both mechanically and adhesively. The shape that the resin 22 bound particulate abrasive 21 assumes within annular spaces 16,17,18 becomes a solid mass upon cure of resin 22 which solid mass is adhesively bound to both member 15 and fitting 10. Additionally, the solid mass defined by the resin bound abrasive has a plurality of shoulders defined thereon which bear against shoulders 19,20 and provide a first mechanical load bearing characteristic of the end attachment of the invention. Secondly, the abrasiveness of the particulate abrasive 21 in the tightly compacted and resin 22 bound form within fitting 10 around member 15 provides coarse mechanically interlocked interfaces with fitting 10 and member 15 which frictionally fix fitting 10 onto member 15. It is further noted that the fitting described in representative fashion herein is not restricted for attachment only to the end of a member 15. But may be attached anywhere along the length thereof for various purposes such as to provide attachment for supporting a cable along a span thereof between spaced points of end attachment, or for the repair of a broken cable.

The invention therefore provides a novel high performance attachment structure and method for a high strength guy wire, cable or like member, which includes a redundant mechanical and adhesive load bearing capability providing high efficiency and reliable load transfer under either static or dynamic loads. It is understood that modifications to the invention may be made as might occur to one with skill in the field of the invention within the scope of the appended claims. All embodiments contemplated hereunder which accomplish the objects of the invention have therefore not been shown in complete detail. Other embodiments may be developed without departing from the spirit of the invention or from the scope of the appended claims.

I claim:

1. A combination mechanically retained and adhesively bonded attachment structure for a cylindrical member, comprising:
    (a) an elongate fitting of preselected external shape having a first end and a second end and along a central axis thereof a plurality of axially displaced coaxial right cylindrical bores of respective preselected diameters, extending through said first and said second end of said elongate fitting; the smallest of said bores having diameter selected to loosely receive a substantially cylindrically shaped member for attachment to said fitting;
    (b) said elongate fitting being configured for placement on said member such that said axially displaced coaxial right cylindrical bores have successively smaller diameters in the direction of axial loads applied to said member; and
    (c) a finely divided particulate abrasive material and solidifiable resin within the annular spaces defined within said fitting and around said member, said resin disposed substantially throughout and surrounding said abrasive material for forming a hardened adhesive bond between said fitting and member, for defining abrasive interfaces between said abrasive material and said fitting and between said abrasive material and said member, and for defining a plurality of annular load bearing shoulders abutting the shoulders defined by said bores in said fitting, when said resin is solidified.

2. The structure of claim 1 wherein said abrasive material is selected from the group consisting of silica, silicon carbide, alumina, silicon nitride, aluminum nitride and diamond.

3. The structure of claim 1 wherein said abrasive material has particle size in the range of 1 to 2000 microns.

4. The structure of claim 1 wherein said curable resin is a thermosetting resin selected from the group consisting of epoxy, acrylic, phenolic, polyester, polyurethane, and polyimide.

5. The structure of claim 1 wherein said curable resin is a thermoplastic resin selected from the group consisting of nylon, polyether ether ketone, polyphenylene sulfide, polyester, polyimide sulfone, and polyamide imide.

* * * * *